No. 767,238. PATENTED AUG. 9, 1904.
I. H. PLEUKHARP.
SPEED CHANGING AND TRANSMISSION GEAR.
APPLICATION FILED MAY 13, 1904.
NO MODEL. 3 SHEETS—SHEET 1.

Witnesses
Benj. Finckel
J. B. Cushman

Inventor
Irvin H. Pleukharp
by Finckel & Finckel
his Attorneys

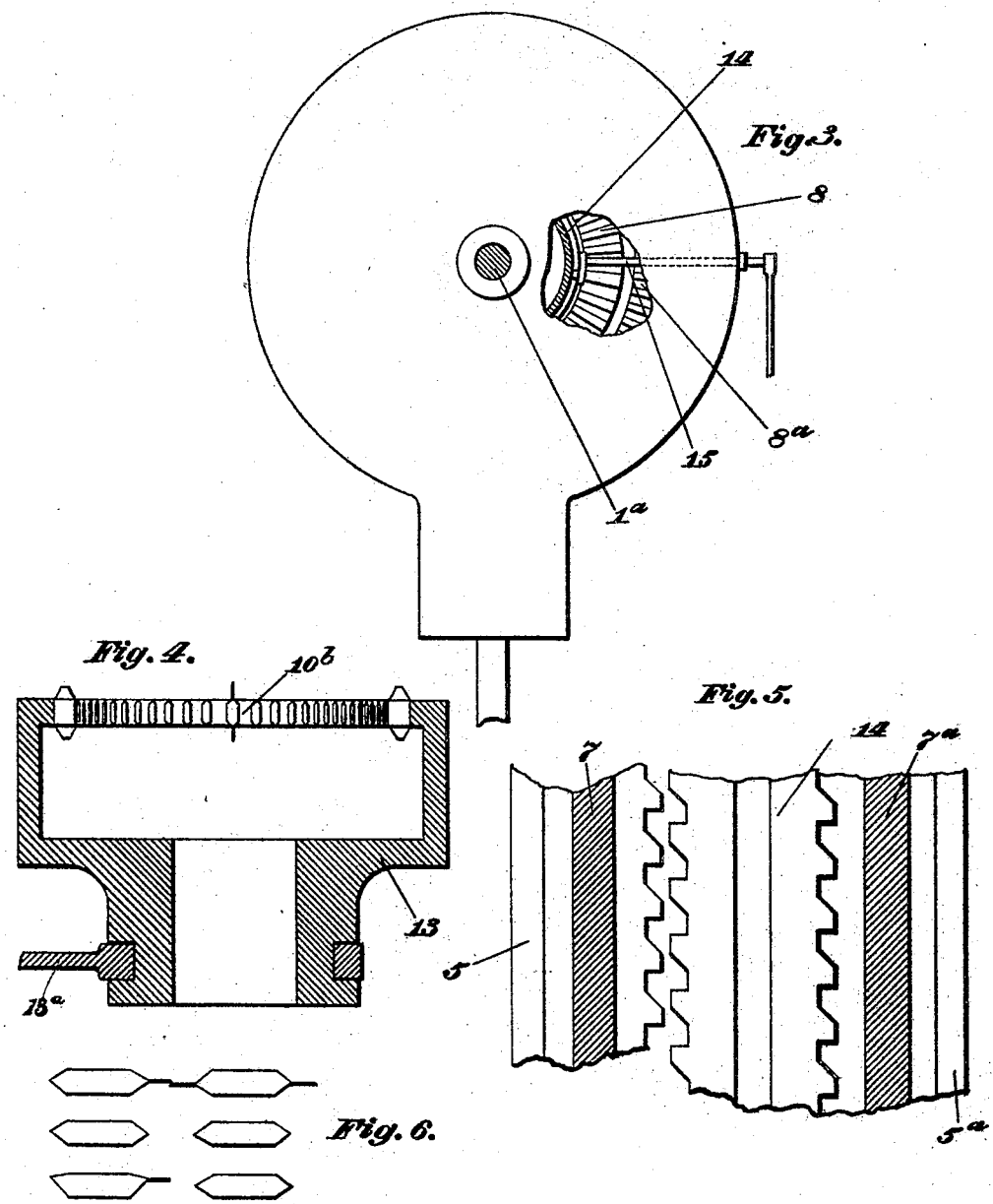

No. 767,238.

Patented August 9, 1904.

UNITED STATES PATENT OFFICE.

REISSUED

IRVIN H. PLEUKHARP, OF COLUMBUS, OHIO, ASSIGNOR OF ONE-FOURTH TO HENRY R. YOUNG, OF COLUMBUS, OHIO.

SPEED-CHANGING AND TRANSMISSION GEAR.

SPECIFICATION forming part of Letters Patent No. 767,238, dated August 9, 1904.

Application filed May 13, 1904. Serial No. 207,836. (No model.)

*To all whom it may concern:*

Be it known that I, IRVIN H. PLEUKHARP, a citizen of the United States, residing at Columbus, in the county of Franklin and State of Ohio, have invented certain new and useful Improvements in Speed-Changing and Transmission Gears; and I do hereby declare the following to be a full, clear, and exact description of the invention, such as will enable others skilled in the art to which it appertains to make and use the same.

The object of this invention is to provide a speed changing and reversing transmission-gear of simple, strong, and economical construction and having a direct drive.

The invention is embodied in the construction hereinafter described and claimed.

Figure 1:
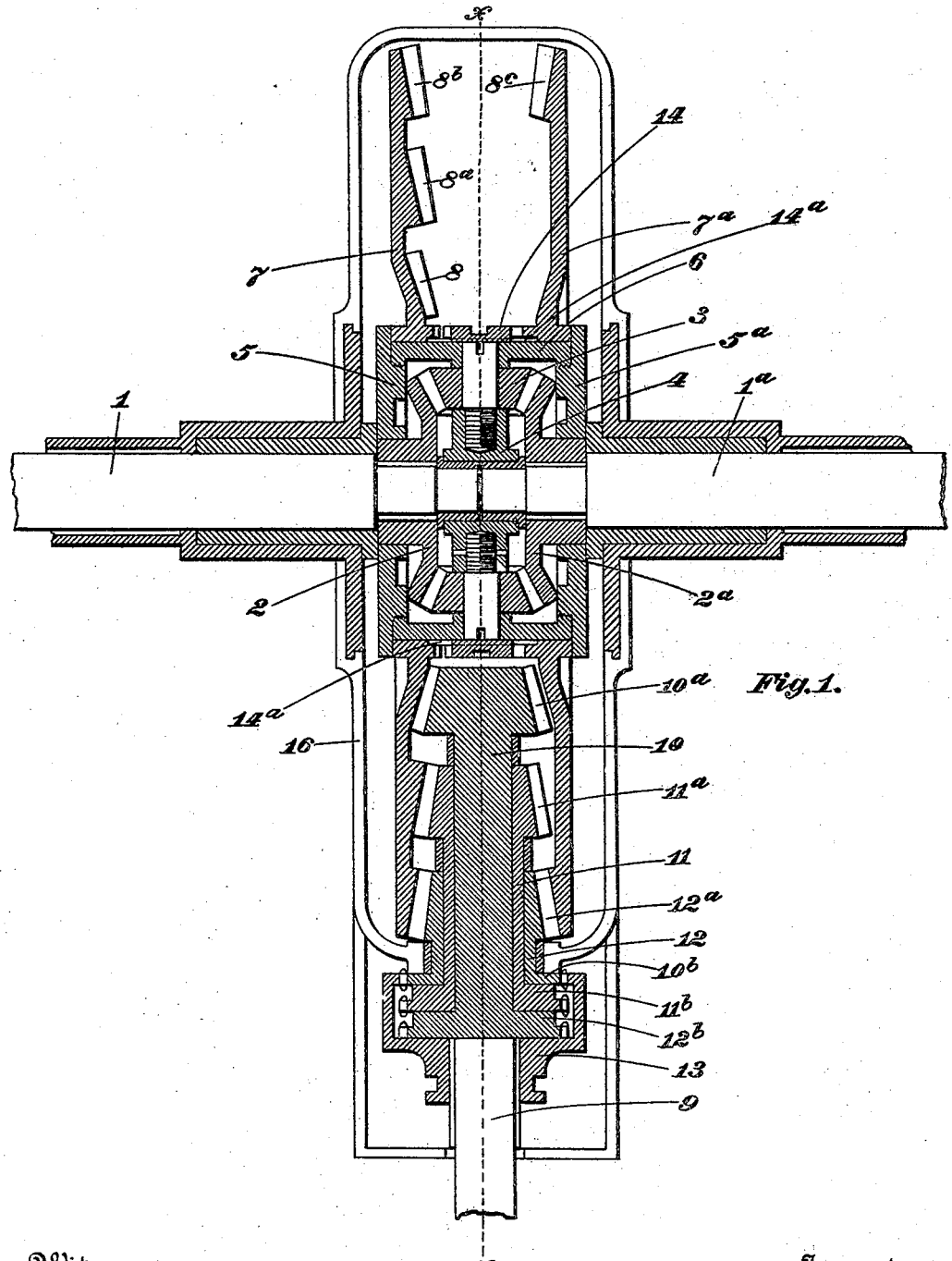
Figure 2:
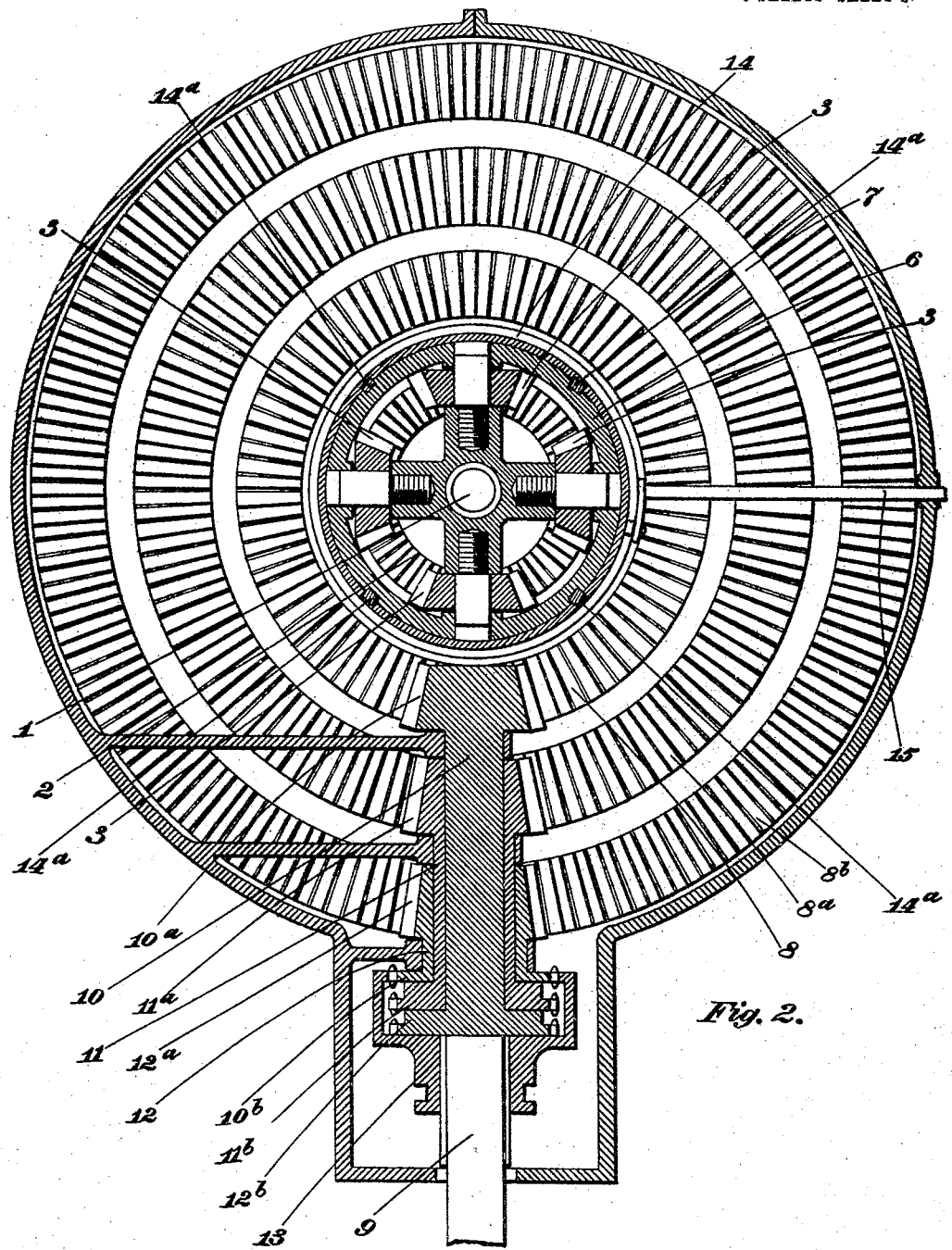

In the accompanying drawings, illustrating one embodiment only of the invention, Figure 1 is a sectional view through the gearing on a plane passing through the axes of the driving and driven shafts or shaft and axle, the shaft and axle not themselves, however, being shown in section. Fig. 2 is a section on the plane $x$ $x$, Fig. 1, looking toward the left. Fig. 3 is a side view on a smaller scale, a portion being broken out to show the ring-clutch-shifting device. Fig. 4 is a diagrammatic fragmentary view showing the driving-disks and ring-clutch therefor. Fig. 5 is a sectional view of the speed-changing clutch or the clutch of the driving-shaft. Fig. 6 is a diagram illustrating the peculiar construction of the teeth of the clutch of the driving-shaft.

Where the driven shaft is the axle of a motor-vehicle or automobile, it will preferably be composed of two parts 1 and $1^a$. These will have their abutting ends provided with a compensating gear permitting one part to move faster than the other and consisting in the instance shown of circular toothed gears 2 and $2^a$, keyed on the ends of the shafts and facing each other, and one or more pinions 3, meshing with the gear 2 and $2^a$, mounted in a collar 4 between said gears. The compensating gearing is inclosed or boxed by heads 5 and $5^a$ and a cylinder-housing ring 6 between said heads, the spindles of the pinions 3 being passed through said cylinder and engaging it, so that if the cylinder be turned the axles 1 and $1^a$ will also be turned. Mounted loosely on the cylinder or box inclosing the compensating gear are two large disks 7 and $7^a$, the former shown to have three rows 8, $8^a$, and $8^b$ of radial face-teeth located in concentric circles and the latter having a single row $8^c$ of such teeth located opposite and parallel to the outermost row $8^b$ on the disk 7.

9 designates the driving-shaft operated by the engine or motor. Arranged beyond the end of this and suitably hung or supported between the disks 7 and $7^a$ are three concentric shafts 10, 11, and 12, having at their inner ends pinions $10^a$, $11^a$, and $12^a$, respectively, meshing with the two rows of teeth 8 $8^a$ and the two rows $8^b$ and $8^c$, respectively. The outer ends of the concentric shafts 10, 11, and 12 are flanged to the same diameter as seen at $10^b$, $11^b$, and $12^b$, and the peripheries of said flanges are toothed. The end of the driving-shaft is furnished with a slip-sleeve or clutch 13, feather-keyed thereon, and said sleeve is furnished at its inner end with a flange internally toothed to engage with the teeth of the flanges $10^b$, $11^b$, and $12^b$. The flanges $10^b$, $11^b$, and $12^b$ are spaced apart sufficiently to permit the teeth proper of the clutch 13 to pass between them without engaging the teeth of two flanges at the same time. The teeth of the clutch and also, if desired, the teeth of the flanges are preferably wedge-shaped at each side, as depicted in Fig. 6, to facilitate their entrance between each other. To further facilitate their entrance and the guidance of the teeth into mesh with each other, several of them can be provided with steel points, preferably flexible, set in staggered or irregular arrangement with respect to each other.

14 designates the reversing-ring clutch. This consists of a thick band of metal fitting around the cylinder or housing ring 6 and keyed thereon by keys $14^a$, that prevent concentric movement thereof with respect to the housing 6, but permit lateral movement thereof thereon. The reversing-clutch is toothed on its opposite edges, as seen in Fig. 5, and the adjacent walls of the disks 7 and $7^a$ are correspondingly toothed. The reversing-ring can of course be slid laterally to engage the corresponding teeth of one or the other of the disks 7 and 7ª, but not both at the same time, and this ring is made with a peripheral groove into which extends the crank end of a shifting-rod 15. The clutch 13 also is provided with an appropriate shifting device 13ª.

The disks 7 and 7ª are inclosed in a suitable housing and preferably so that they can run in oil.

The operation is as follows: The direction of motion of the driving-shaft 9 and clutch 13 is always the same. If the clutch-ring 14 be engaged by the disk 7, three different speeds of the axle 1 and 1ª in one direction—for example, the forward direction—can be obtained by shifting the clutch 13 outward. By shifting the clutch farther outward the clutch 13 runs free and transmits no motion to the axle. By shifting the clutches 14 and 13 into the position seen in Fig. 1 the motion of the axle is reversed, because the disk 7ª becomes connected with the differential gear-housing.

The forms and proportions of the parts can be varied without departing from the essence of the invention.

The disk 7ª can of course be provided with three rows of concentric teeth instead of one.

What I claim, and desire to secure by Letters Patent, is—

1. In a power-transmission mechanism, the combination of a driven shaft, two disks thereon and normally loose with respect thereto having concentric rows of gear-teeth facing each other, a movable clutch to connect either of said disks with said shaft, concentric shafts bearing pinions to engage the teeth of the disks, a driving-shaft, and a clutch thereon movable to connect any of said pinions rotatively therewith.

2. In a power-transmission mechanism, the combination with a two-part driven shaft or axle, a differential gearing connecting them and a housing therefor, of two disks normally loose on said housing and having concentric rows of gear-teeth facing each other, a clutch to connect either of said disks with said housing, concentric shafts bearing pinions to engage the teeth of the disks, a driving-shaft, and a clutch thereon movable to operatively connect any of said pinions with said driving-shaft.

3. In a power-transmission mechanism, the combination with a two-part driven shaft or axle, a differential gearing connecting them comprising gears 2 and 2ª keyed thereon and a pinion or pinions 3 between and engaging them, a housing-ring connected with said pinions, two disks loose on said housing-ring having concentric rows of teeth facing each other, a clutching-ring connected with said housing-ring adapted to be slid laterally to engage either of said disks and connect it operatively with the housing-ring, concentric shafts bearing pinions to engage the teeth of the disks, a driving-shaft and sliding clutch thereon adapted to operatively connect any of said pinions with said driving-shaft.

4. In a power-transmission mechanism, the combination with a two-part driven shaft or axle, a differential gearing connecting them comprising gears 2 and 2ª keyed thereon and a pinion or pinions 3 between and engaging them, a housing-ring connected with said pinions, two disks loose on said housing-ring having concentric rows of gear-teeth facing each other, and clutching-teeth, a clutching-ring having its edges toothed to engage the clutching-teeth of the disks and connected with said housing-ring so as to be movable laterally thereon and connect operatively either of the disks with the housing-ring, concentric shafts bearing pinions to engage the teeth of the disks, a driving-shaft and sliding clutch thereon adapted to operatively connect any of said pinions with said driving-shaft.

5. A transmission-gearing having meshing gears provided with teeth having wedge-shaped edges and an elastic guiding-finger on one or more of the teeth.

6. In a transmission-gearing, meshing gears provided with teeth having wedge-shaped edges and elastic guiding-fingers on said teeth differently located as regards their position with respect to the body of the tooth.

In testimony whereof I affix my signature in presence of two witnesses.

IRVIN H. PLEUKHARP.

Witnesses:
C. J. HUTSON,
BENJ. FINCKEL.